United States Patent [19]

Weems, Sr.

[11] Patent Number: 4,504,391

[45] Date of Patent: Mar. 12, 1985

[54] WATER WELL SAND SEPARATOR

[76] Inventor: Kelly G. Weems, Sr., 6700 Bayou Pines Dr., Biloxi, Miss. 39532

[21] Appl. No.: 479,804

[22] Filed: Mar. 28, 1983

[51] Int. Cl.³ ............................................. B01D 35/02
[52] U.S. Cl. .................................. 210/307; 210/313; 210/437; 210/489
[58] Field of Search ............... 210/484, 459, 184, 286, 210/441, 118, 315, 337, 338, 421, 422, 456, 458, 460, 303, 307, 308, 313, 314, 437, 489, 418; 405/45, 43; 166/205, 236, 56, 75 R, 265, 267

[56] References Cited

U.S. PATENT DOCUMENTS

| | | | |
|---|---|---|---|
| 364,599 | 6/1887 | Morris | 210/286 |
| 1,011,482 | 12/1911 | Pemberton | 210/437 |
| 2,837,032 | 6/1958 | Horsting, Sr. | 166/227 |
| 2,946,449 | 7/1960 | Shaw | 210/484 |
| 3,127,255 | 3/1964 | Winslow | 210/307 |
| 3,303,933 | 2/1967 | Huff | 210/459 |
| 3,314,481 | 4/1967 | Willman et al. | 166/205 |
| 4,059,520 | 11/1977 | Roller | 210/184 |
| 4,064,049 | 12/1977 | Calvano | 210/247 |

Primary Examiner—John Adee
Attorney, Agent, or Firm—Harvey B. Jacobson

[57] ABSTRACT

An elongated upstanding hollow casing is provided including an upper end water outlet and a lower end combined sand and water outlet. The casing includes a mid-height laterally outwardly opening water inlet and a central upstanding tube is disposed within the casing. The tube includes a capped lower end and its upper end is in sealed communication with the upper end water outlet. The central tube includes circumferentially and longitudinally spaced apertures formed therein intermediate the capped lower end and the upper water outlet and a thick-walled tubular body is disposed about the apertured tube. The thick-walled tubular body is constructed of porous filter material such as foam rubber and the lower end sand and water outlet includes a valve assembly operatively associated therewith for selectively opening and closing the sand and water outlet. The tubular body is fitted tightly about the apertured portions of the central tube and a protective bank extends at least substantially entirely about that portion of the tubular body with which the water inlet is registered.

8 Claims, 4 Drawing Figures

WATER WELL SAND SEPARATOR

BACKGROUND OF THE INVENTION

Many water wells are drilled in strata high in sand content and these wells many times discharge appreciable quantities of sand along with the water pumped therefrom. Accordingly, a need exists for an apparatus whereby sand may be separated from the water pumped from a well in a convenient, reliable and economical manner.

Examples of separators including some of the general structural and operational features of the instant invention are disclosed in U.S. Pat. Nos. 364,599, 2,946,449, 3,303,933, 3,538,546, 4,059,520 and 4,064,049. However, most previously known separators are not generally considered as operable under high sand contaminated water pumping conditions and are not usually considered as constructed for high sand abrasive resistant operation.

SUMMARY OF THE INVENTION

The water well sand separator of the instant invention comprises an elongated cylindrical casing for use in an upstanding position and includes a mid-height well water inlet, an upper water outlet and a lower end water and sand outlet. The interior of the casing includes a central elongated upstanding perforated pipe having its upper end in sealed communication with the water outlet and the lower end of the perforated pipe is closed at its lower end. The pipe is enclosed within a tubular sleeve of filter material such as foam rubber and the area of the sleeve registered with the water inlet is armored against abrasion by sand entrained within the water being admitted to the sand separator through the water inlet. Various parts of the water separator casing and the center apertured pipe and sand filtering sleeve are removably assembled for ease in disassembly for repair and/or servicing and the lower outlet of the casing is equipped with a control valve whereby the interior of the casing may be drained of accumulated sand and water when such draining is necessary.

The main object of this invention is to provide a water well sand separator which can be readily interposed in a water well delivery line downstream from the water well pump.

Another object of this invention is to provide a sand separator for a water well which may be readily disassembled for servicing and/or repair.

Still another object of this invention is to provide a water well sand separator which includes structure for occasional draining of accumulated sand therefrom.

A final object of this invention to be specifically enumerated herein is to provide a water well sand separator in accordance with the preceding objects and which will conform to conventional forms of manufacture, be of simple construction and easy to install so as to provide a device that will be economically feasible, long lasting and relative trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
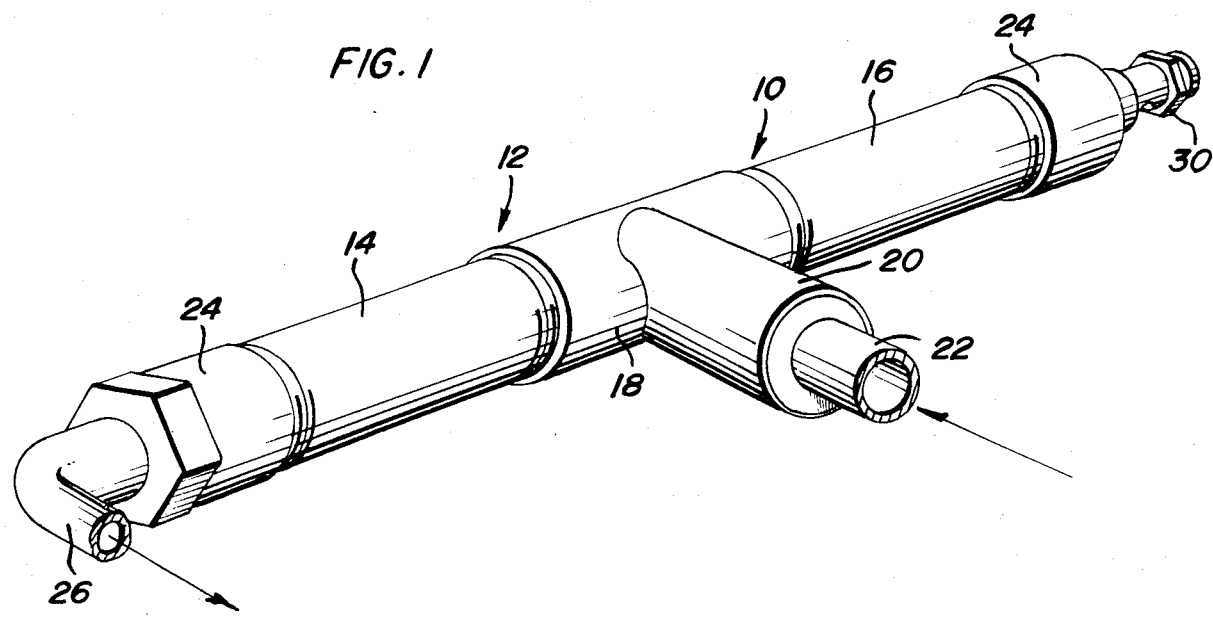
FIG. 1 is a perspective view of the separator disposed in a horizontal position.
Figure 4:
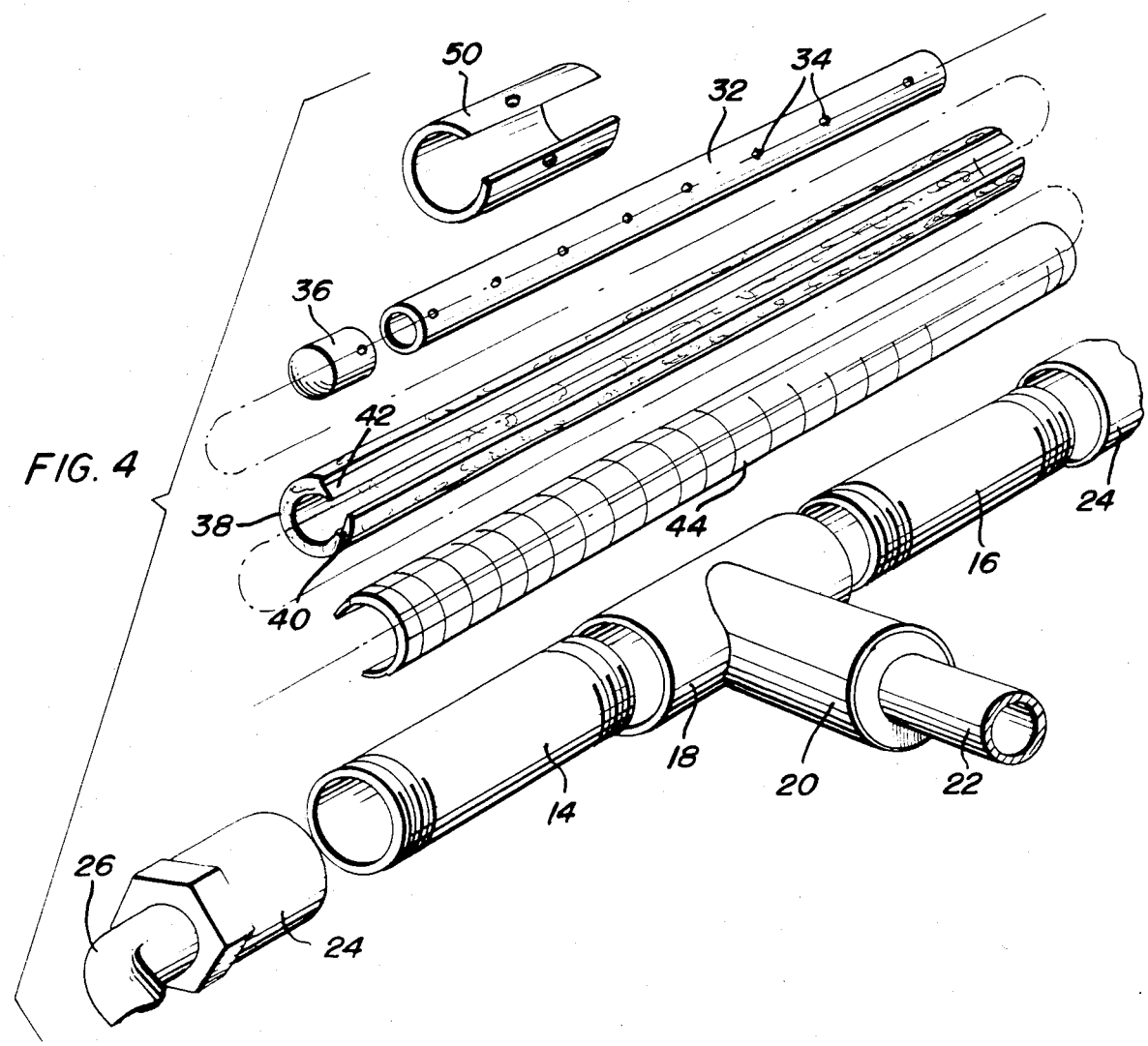
FIG. 4 is an exploded perspective view of the separator.
Figure 2:
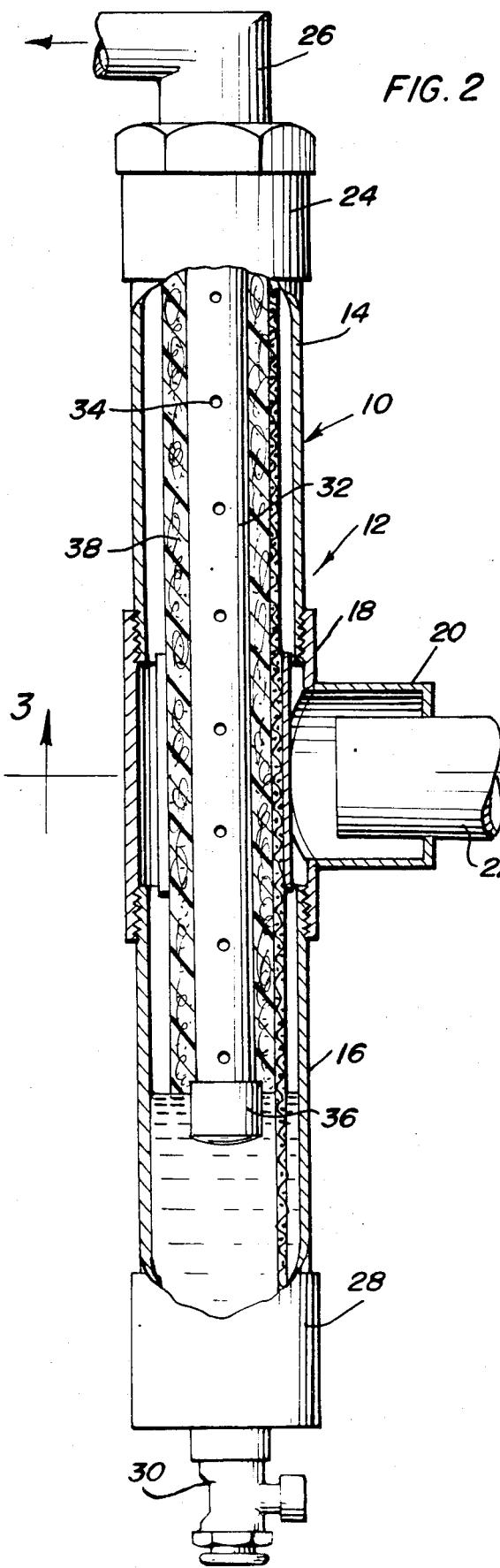
FIG. 2 is a fragmentary elevational view of the separator in its vertical upstanding use position and with portions of the separator being broken away and illustrated in vertical section.
Figure 3:
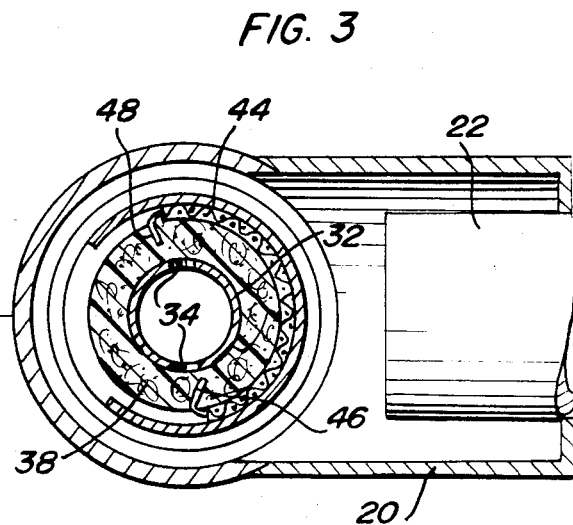
FIG. 3 is an enlarged horizontal sectional view taken substantially upon the plane indicated by the section line 3—3 of FIG. 2.

Referring now more specifically to the drawings, the numeral 10 generally designates the water well sand separator of the instant invention. The separator 10 includes an elongated upstanding housing or casing referred to in general by the reference numeral 12 which comprises a pair of vertically spaced upper and lower tubular housing halves 14 and 16 joined at their adjacent ends through the utilization of a tee coupling 18 defining a water inlet 20 into which a water delivery pipe 22 from an associated water well (not shown) opens. The housing halves 14 and 16 are threadedly engaged within the tee coupling 18 and the upper end of the housing half 14 includes an upper end cap 24 through which a filtered water outlet fitting 26 opens. The lower end of the housing half 16 is closed by an end cap 28 through which a hose bib or other suitable valved outlet fitting 30 opens.

The interior of the casing or housing 12 includes a central tube 32 therein and the upper end of the tube 32 is sealed communication with the water outlet fitting 26. The tube 32 includes longitudinally and circumferentially spaced radial apertures 34 formed therein and the lower end of the tube 32 is closed by an end cap 36 spaced slightly above the lower end of the housing 12.

The portion of the tube 32 spaced between the end cap 36 and the water outlet fitting 26 is tightly enclosed within a sleeve 38 of sand filtering materials such as open cellular foam rubber or the like and the sleeve 38 actually comprises a longitudinally slotted sleeve defining opposing longitudinal edge portions 40 and 42 which are rabbeted and overlapped to form a tight seal along the marginal edges 40 and 42.

A partial cylindrical hardware screen 44 closely embraces the sleeve 38 and bridges the juncture between the marginal edges 40 and 42 and the opposing edges of the screen 44 include laterally directed wire ends 46 and 48 which are inwardly directed and embedded in the sleeve 38.

In addition, a partial armor sleeve 50 is provided and is pop riveted to the screen or screen panel 44 in position with the armor sleeve 50 registered with the water inlet 20. The armor sleeve 50 prevents sand erosion of the hardware screen panel 44 and the sleeve 38 registered with the water inlet 20.

It is to be noted that the various components which form the casing or housing 12 may be constructed of PVC pipe and that the end caps 24 and 28 as well as the water outlet fitting 26 may also be constructed of PVC material. Further, the hose bib 30 may include major portions constructed PVC.

In operation, water entering the inlet 20 and passing into the interior of the casing 12 from the associated well may not enter the tube 32 in sealed communication with the water outlet fitting 26 without passing through the sand filtering sleeve 38. Accordingly, the sand within the water entering the casing or housing 12 is filtered therefrom before the water passes into the tube 32 through the apertures 34 and sand free water is discharged from the water outlet fitting 26. As the exterior surfaces of the sleeve 38 become clogged with filtered sand, the flow capacity of the separator 10 will be reduced. When the flow capacity of the separator 10 has been reduced by the accumulation of sand on the external surfaces of the sleeve 38, the hose bib 30 may be opened whereupon the water entering the casing or housing 12 through the water inlet 20 will flush the exterior surfaces of the sleeve 38 free of sand and the sand will be discharged from the separator 10 through the hose bib 30. Of course, the water being discharged through the hose bib 30 may be used for purposes such as lawn watering that do not require sand free water. After the interior of the casing 12 has been flushed substantially free of sand, the hose bib 30 may again be closed to allow the filter 10 to again be effective in filtering sand from the water entering the casing 12 through the water inlet 20.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as folows:

1. A water well sand separator including an upstanding hollow casing having an upper end water oulet and a lower end sand water outlet, said casing including a laterally outwardly opening water inlet centrally intermediate its opposite ends, a central outstanding tube disposed in said casing, said tube being capped at its lower end and mounted in sealed communication with said upper end water outlet at its upper end, said central tube including circumstantially and longitudinally spaced apertures formed therein intermediate the capped lower end and said water outlet, a thick-walled tubular body disposed about said apertured tube, said tubular body being constructed of porous filter material, an armor sleeve supported from and disposed partially about that portion, only, of said tubular body registered with said water inlet and spaced appreciably from the opposite ends of said tubular body, the lower end sand and water outlet including valve means for selectively opening and closing said sand and water outlet, said tubular body being fitted tightly about the apertured portions of said central tube.

2. The sand separator of claim 1 wherein said tubular body comprises a longitudinally split sleeve equipped with rabbeted and overlapped longitudinal marginal portions, said porous filter material being resilient whereby said sleeve may be opened up for lateral withdrawal from engagement about said central tube.

3. The sand separator of claim 2 including a wire mesh panel disposed exteriorly of said sleeve and bridging the juncture defined by said lapped longitudinal edges, said panel including remote edges laterally inwardly directed and embedded in said porous filter material.

4. The sand separator of claim 3 wherein said casing includes removable opposite end caps in which said water outlet and said water and sand outlets are formed.

5. The sand separator of claim 4 wherein said casing, intermediate said end caps, is defined by a pair of aligned axially spaced opposite end casing sections with whose remote ends said end caps are threadedly engaged, and a tee fitting interposed between the adjacent ends of said casing sections and with which said adjacent ends are threadedly engaged, said tee fitting defining said water inlet.

6. The sand separator of claim 5 wherein said tubular body is constructed of open cell foam rubber.

7. The sand separator of claim 6 wherein said armor sleeve is disposed exteriorly of said wire mesh panel.

8. The sand separator of claim 7 wherein said end caps, opposite end casing sections and tee fitting are constructed of PVC material.

* * * * *